US006231984B1

(12) United States Patent
Horibe et al.

(10) Patent No.: US 6,231,984 B1
(45) Date of Patent: May 15, 2001

(54) MULTILAYER COATING FILM FORMATION PROCESS

(75) Inventors: Kyoichi Horibe; Masami Suwama, both of Hiratsuka (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/179,819

(22) Filed: Oct. 28, 1998

(30) Foreign Application Priority Data

| | | |
|---|---|---|
| Oct. 28, 1997 | (JP) | 9-294694 |
| Oct. 28, 1997 | (JP) | 9-311020 |
| Dec. 10, 1997 | (JP) | 9-340280 |

(51) Int. Cl.[7] ........ C23C 28/00; B32B 15/08

(52) U.S. Cl. ........ 428/416; 204/488; 204/478

(58) Field of Search ........ 204/484, 488, 204/478; 428/457, 416; 427/511; 524/539

(56) References Cited

U.S. PATENT DOCUMENTS

| | | | | |
|---|---|---|---|---|
| 4,888,244 | * | 12/1989 | Masubuchi et al. | 428/416 |
| 5,432,005 | * | 7/1995 | Tanigami et al. | 428/414 |
| 5,597,861 | * | 1/1997 | Nakae et al. | 524/601 |
| 5,798,147 | * | 8/1998 | Beck et al. | 427/511 |
| 5,919,856 | * | 7/1999 | Nishi et al. | 524/539 |

* cited by examiner

*Primary Examiner*—Kathryn Gorgos
*Assistant Examiner*—Thao Tran
(74) *Attorney, Agent, or Firm*—Wenderoth, Lind & Ponack, L.L.P.

(57) ABSTRACT

A process to form a multilayer coating film, which is excellent in smoothness and capable of preventing a generation of popping even in case of a thick coating, characterized by that after a cationic electrodeposition coating is coated and cured by heating, an intermediate coating, comprising polymerizable unsaturated compound, photopolymerization initiator, thermal polymerization initiator, and further optionally pigment and/or polyester resin and crosslinking agent, is coated, and the coating film is cured by irradiation with an actinic ray, and then a thermocurable top coating is coated and cured by heating, is disclosed.

36 Claims, No Drawings

MULTILAYER COATING FILM FORMATION PROCESS

The present invention relates to a multilayer coating film formation process comprising coatings with a cationic electrodeposition coating, an intermediate coating and a top coating, and especially relates to a process to form a multilayer coating film in which a gene-ration of popping caused by baking is prevented and the smoothness of the coating surface is improved.

It is known to form a multilayer coating film by coating with a top coating, after coating and curing by heating of an intermediate coating on the cured coating surface of a cationic electrodeposition coating, and the formed multilayer coating film is excellent in smoothness etc. and has been adopted in many fields. However, in these days, it is proposed, for a reason to shorten the operation steps etc., to omit the heating step of the intermediate coating film, to coat said uncured coating surface with a top coating, and then to cure these coating films by heating at the same time.

However, the cured coating surface of a cationic electrodeposition coating has usually fine unevenness and its smoothness is essentially bad. Therefore, when an intermediate coating is coated on this coating surface and a top coating is further coated before curing, there is a disadvantage that the unevenness of the coating surface of a cationic electrodeposition coating appears also on the top coating surface and the smoothness is not sufficient. In order to improve the smoothness, the intermediate coating film may be made thicker. However, in that case, there arises a problem of generation of popping caused by a bumping of organic solvent in the coating film, when it is heated after the coating with a top coating.

The purpose of the present invention is to propose a process to form a multilayer coating film, which is excellent in smoothness or finishing appearance and capable of preventing the generation of popping caused by baking even thickly coated, without curing the intermediate coating film by heating (operation steps shortening) in a coating process to successively coat with a cationic electrodeposition coating, an intermediate coating, and a top coating.

Means to Solve the Problem

As a result of an intensive study aiming at achieving the above-mentioned purpose, the present inventors have found this time, that the above-mentioned purpose can be achieved by using as an intermediate coating a coating material, which can be cured both by irradiation with an actinic energy ray and heating, coating with a top coating after the intermediate coating film has been at least partly cured by irradiation with an actinic energy ray, and then by curing by heating the coating films, and completed the present invention.

Thus according to the present invention, there is proposed a multilayer coating film formation process characterized by that after a cationic electrodeposition coating has been coated and cured by heating, an intermediate coating, comprising polymerizable unsaturated compound, photopolymerization initiator and thermal polymerization initiator, and further optionally polyester resin and crosslinking agent, is coated, and said coating film is cured by irradiation with an actinic energy ray, and a thermocurable top coating is coated and cured by heating.

The multilayer coating film formation process of the present invention is hereinafter described in more detail.

Substrate

Substrates, to which the process of the present invention is applied, are not particularly limited so long as they are formed articles having an electroconductive surface capable of cationic electrodeposition coating. However, the process of the present invention is particularly useful for coating of outer panels of automobile body, for example, roof, door outer panel, bonnet hood, trunk lid, fender, front apron etc.; and of inner panels, for example, door inner panel, inside of the bonnet hood, trunk room etc.

Cationic Electrodeposition Coating (A)

As a cationic electrodeposition coating (A) to be coated on the above-mentioned substrates, a cationic electrodeposition coating comprising a base resin having hydroxyl group and cationizable group (a-1) and a crosslinking agent such as block polyisocyanate compound (a-2) is preferable.

Here, as a base resin (a-1), a resin, obtained by reacting a cationizing agent with an epoxy resin obtained by reacting a polyphenol compound and epichlorohydrin, namely, a polyglycidyl ether of a polyphenol compound, is preferable.

An epoxy resin, before reacting with a cationizing agent, has two or more than two epoxy groups in the molecule and may have a number-average molecular weight in a range of more than 200, preferably 400–4,000, and more preferably 600–3000, and an epoxy equivalent in a range of 190–2,000, preferably 400–1,000, and more preferably 500–800.

As a polyphenol compound, which can be used to prepare said epoxy resin, there can be mentioned, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxybutyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulphone, phenol novolac, cresol novolac etc.

As a cationizing agent to be used to introduce a cationizable group in said epoxy resin, there can be mentioned, for example, amine compound such as primary amine, secondary amine, tertiary amine, polyamine etc. They are reacted preferably with almost all or all epoxy groups existing in the epoxy resin. They react with epoxy group and form cationizable groups such as secondary amino groups, tertiary amino groups, quaternary ammonium base etc.

Hydroxyl groups of the base resin (a-1) include, for example, a primary hydroxyl group introduced by an alkanolamine to be able to be used as a cationizing agent, ring-opening of caprolactone, which may be reacted with an epoxy resin to modify said resin, or by reaction with a polyol etc.; a secondary hydroxyl group formed by ring-opening of an epoxy group in an epoxy resin, etc. Among them, a primary hydroxyl group introduced by a reaction with an alkanolamine is excellent in crosslinking reactivity with a block polyisocyanate compound (crosslinking agent) and preferable.

The base resin (a-1) has preferably a hydroxyl group equivalent in a range of 20–5,000 mgKOH/g, particularly 100–1,000 mgKOH/g, and more particularly 200–800 mgKOH/g, and especially a primary hydroxyl group equivalent in a range of 200–1,000 mgKOH/g, above all 230–750 mgKOH/g. On the other hand, cationizing groups are sufficient with more than an amount necessary to be able to stably disperse said base resin in water and preferably in a range of generally 3–200, particularly 5–150, and more particularly 10–80, calculated as KOH (mg/g solid content) (amine value).

The base resin (a-1) is desirable not to contain a free epoxy group in principle.

In the cationic electrodeposition coating (A), as a crosslinking agent (a-2) to cure the base resin (a-1) by crosslinking, a block polyisocyanate compound is mainly used.

A block polyisocyanate compound is a polyisocyanate compound whose isocyanate groups are all blocked by a blocking agent to make them inactive at normal temperature. When it is heated to a temperature, which is higher than the prescribed temperature, preferably higher than 120° C., the blocking agent is dissociated and the original isocyanate group is regenerated to take part in the crosslinking reaction.

A polyisocyanate compound is a compound having two or more, preferably 2–3 free isocyanate groups in the molecule and includes, for example, aliphatic diisocyanates such as hexamethylene diisocyanate, trimethylene diisocyanate, tetramethylene diisocyanate, dimer acid diisocyanate, lysine diisocyanate etc.; alicyclic diisocyanates such as isophorone diisocyanate, methylenebis(cyclohexylisocyanate), methylcyclohexane diisocyanate, cyclohexane diisocyanate, cyclopentane diisocyanate etc.; aromatic diisocyanates such as xylylene diisocyanate, tolylene diisocyanate, diphenylmethane diisocyanate, naphthalene diisocyanate, toluidine diisocyanate etc.; urethanization adducts, biuret type adducts, isocyanuric ring type adducts of these polyisocyanates etc.

As a blocking agent, there can be mentioned, for example, phenol type blocking agents, alcohol type blocking agents, active methylene type blocking agents, mercaptan type blocking agents, acid amide type blocking agents, imide type blocking agents, amine type blocking agents, imidazole type blocking agents, urea type blocking agents, carbamic acid type blocking agents, imine type blocking agents, oxime type blocking agents, sulphurous acid type blocking agents, lactame type blocking agents etc.

In the cationic electrodeposition coating (A), the compounding ratio of the base resin (a-1) and the crosslinking agent (a-2) is preferable in a range of 40–90%, particularly 50–80% for the former and 60–10%, particularly 50–20% for the latter based upon the total solid content weight of both said components.

A cationic electrodeposition coating (A) can be prepared, for example, by mixing a base resin (a-1) and a crosslinking agent (a-2), neutralizing the catioinizable groups in the base resin (a-1) by an acid substance such as acetic acid, formic acid, lactic acid, phosphoric acid etc. and dispersing in an aqueous medium. The pH of the obtained aqueous dispersion is preferably in a range of 3–9, particularly 5–7 and the resin solid content concentration is suitable in a range of 5–30% by weight, particularly 8–25% by weight.

In the cationic electrodeposition coating (A), there can be suitably compounded, as necessary, additives for coating material such as rust-preventive curing catalyst, filler, color pigment, rust-preventive pigment, sedimentation inhibitor etc.

Coating with a cationic electrodeposition coating (A) can be conducted, for example, by electrodeposition using an electroconductive metal such as automobile body (substrate) as cathode and a carbon plate as anode, under the conditions of 20–35° C. bath temperature, 100–400V voltage, 0.01–5A current density for 1–10 minutes. Coating film thickness is preferable in a range of usually 10–40 $\mu$m, particularly 15–30 $\mu$m in terms of cured coating film. The coating film thus formed can be cured by crosslinking by heating at about 140 to about 190° C. for about 10 to about 40 minutes.

This electrodeposition coating film may be formed on nearly all surfaces of outer panels and inner panels of an automobile body (substrate).

Intermediate Coating (B)

According to the process of the present invention, on the cationic electrodeposition coating film surface formed as mentioned above, an organic solvent type coating, comprising a polymerizable unsaturated compound (b-1), photopolymerization initiator (b-2) and thermal polymerization initiator (b-3), and further, as necessary, pigment (b-4), is coated.

A polymerizable unsaturated compound (b-1) is a compound having one or more, preferably 2–5 polymerizable unsaturated bonds in the molecule and includes the following compounds.

a) $C_{1-22}$, preferably $C_{1-12}$ alkyl esters of (meth)acrylic acid such as methyl (meth)acrylate, ethyl (meth) acrylate, propyl (meth)acrylate, butyl (meth)acrylate, hexyl (meth)acrylate, octyl (meth)acrylate, lauryl (meth)acrylate, 2-ethylhexyl (meth)acrylate etc.;

b) mono(or di)esterified products of $C_{2-20}$, preferably $C_{2-8}$ alkylene glycol such as ethylene glycol, propylene glycol, butylene glycol etc. with (meth)acrylic acid;

c) unsaturated dicarboxylic acids or their modified products such as maleic acid, itaconic acid, fumaric acid, methaconic acid, or their anhydrides or half esterified products;

d) $C_{2-18}$, preferably $C_{2-8}$ alkoxyalkyl esters of (meth) acrylic acid such as methoxybutyl (meth)acrylate, methoxyethyl (meth)acrylate, ethoxybutyl (meth) acrylate etc.;

e) aminoacryl type monomers, whose amino group may be optionally mono- or disubstituted by $C_{1-4}$ alkyl group, such as aminoethyl (meth)acrylate, N,N-dimethylaminoethyl (meth)acrylate, N,N-diethylaminoethyl (meth)acrylate, N-t-butylaminoethyl (meth)acrylate etc.;

f) acrylamide type monomers such as (meth)acrylamide, N-methylol (meth)acrylamide, N-n-butoxymethyl (meth)acrylamide, N-methoxymethyl (meth) acrylamide, N-methyl (meth)acrylamide, N-ethyl (meth)acrylamide, N,N-dimethyl (meth)acrylamide etc.;

g) glycidyl group-containing unsaturated monomers such as glycidiyl (meth)acrylate, allyl glycidyl ether etc.;

h) vinyl compounds such as styrene, $\alpha$-methylstyrene, vinyltoluene, acrylonitrile, vinyl acetate, vinyl chloride, N-vinylpyrrolidone etc.;

i) modified acrylate compounds such as phenolethylene oxide-modified acrylates represented by Ph—O—$(C_2H_4O)_n$—OCHC═$CH_2$ (wherein PH is a phenyl, which may be optionally substituted with $C_{1-15}$ alkyl group, and n is an integral number of 1–6), 2-ethylhexylcarbitol acrylate, bisphenol A ethylene oxide-modified diacrylate, isocyanuric acid ethylene oxide-modified diacrylate, tripropylene glycol diacrylate, pentaerythritol diacrylate monostearate, tetraethylene glycol diacrylate, polyethylene glycol diacrylate, polypropylene glycol diacrylate, pentaerythritol triacrylate, trimethylolpropane triacrylate, trimethylolpropane propylene oxide-modified triacrylate, isocyanuric acid ethylene oxide-modified triacrylate, trimethylolpropane ethylene oxide-modified triacrylate, dipentaerythritol penta or hexaacrylate, pentaerythritol tetraacrylate, an oligomer in which both terminal hydroxyl groups of a polyurethane are added with 2 moles of acrylic acid, $\omega$-carboxy-polycaprolactone monoacrylate, monohydroxyethyl phthalate acrylate, acrylic acid dimer, 2-hydroxy-3-phenoxypropyl acrylate, an oligomer in which both terminal hydroxyl groups of a polyester are added with two or more two moles of acrylic acid, etc.

Such a polymerizable unsaturated compound (b-1) has preferably a number-average molecular weight in a range of generally 50–3,000, particularly 100–2,000.

A photopolymerization initiator (b-2) is for the promotion of crosslinking (polymerization) reaction of the above-mentioned polymerizable unsaturated compound (b-1) by irradiation of an actinic energy ray and includes, for example, benzoin, benzoin methyl ether, benzoin ethyl ether, 2-methylbenzoin, benzyl, benzyl dimethyl ketal, diphenyl sulphide, tetramethylthiuram monosulphide, diacetyl, eosine, thionine, Michler's ketone, anthracene, anthraquinone, acetophenone, α-hydroxyisobutylphenone, p-isopropyl-α-hydroxyisobutylphenone, α,α'-dichloro-4-phenoxyacetophenone, 1-hydroxy-1-cyclohexyl-acetophenone, 2,2-dimethoxy-2-phenylacetophenone, methylbenzoyl formate, 2-methyl-1-[4-(methylthio)phenyl]-2-morpholino-propene, thioxanthone, benzophenone, 2,2-dimethoxy-1,2-diphenylethan-1-one, 1-hydroxy-cyclohexyl-phenyl-ketone, benzophenone, 2-methyl-1-[4-(methylthio)phenyl]-2-morpholinopropanone, 1,2-benzyl-2-dimethylamino-1-(4-morpholinophenyl)-butanone, 1,2-hydroxy-2-methyl-1-phenyl-propan-1-one, 2,4,6-trimethylbenzoyldiphenyl-phosphine oxide, 1-[4-(2-hydroxyethoxy)phenyl]-2-hydroxy-2-methyl-1-propan-1-one, 2-hydroxy-2-methyl-1-phenylpropan-1-one, bisacylphosphine oxide, ($\eta^5$-2,4-cyclopentadien-1-yl)[(1,2,3,4,5,6-η)-(1-methyl-ethyl)benzene]-iron(1+)-hexafluorophosphate(1-) etc.

The compounding ratio of such a photopolymerization initiator (b-2) in an intermediate coating (B) is suitable in a range of generally 0.1–10 parts by weight, particularly 0.3–7.5 parts by weight, and more particularly 0.5–5 parts by weight per 100 parts by weight of the above-mentioned polymerizable unsaturated compound (b-1).

A thermal polymerization initiator (b-3) is for the promotion of crosslinking (polymerization) reaction by heating of the polymerizable unsaturated compound contained in the intermediate coating film of the part where an actinic ray was not irradiated or of the part where irradiation was not sufficient, and includes, for example, peroxides such as benzoyl peroxide, di-t-butyl hydroperoxide, t-butyl hydroperoxide, cumyl peroxide, cumene hydroperoxide, diisopropylbenzan hydroperoxide, t-butyl peroxybenzoate, lauryl peroxide, acetyl peroxide, t-butylperoxy-2-ethylhexanoate etc.; azo compounds such as α,α'-azobisisobutylonitrile, azobisdimethylvaleronitrile, azobiscyclohexanecarbonitrile etc.

The compounding ratio of such a thermal polymerization initiator (b-3) in an intermediate coating (B) is suitable in a range of generally 0.1–10 parts by weight, particularly 0.3–7.5 parts by weight, and more particularly 0.5–5 parts by weight per 100 parts by weight of the above-mentioned polymerizable unsaterated compound (b-1).

As a pigment (b-4) there can be used, for example, color pigments such as titanium oxide, zinc oxide, carbon black, Cadmium Red, Molybdenum Red, Chrome Yellow, chromium oxide, Prussian Blue, Cobalt Blue, azo pigments, phthalocyanine pigments, quinacridone pigments, isoindrine pigments, Threne type pigments, perylene pigments etc.; fillers such as talc, clay, kaolin, baryta, barium sulphate, barium carbonate, calcium carbonate, silica, alumina white etc.; metallic pigments such as alumunium powder, mica powder, mica powder coated with titanium oxide etc.

The compounding ratio of such a pigment (b-4) in an intermediate coating (B) is suitable in a range of generally less than 250 parts by weight, particularly 1–200 parts by weight, and more particularly 3–150 parts by weight per 100 parts by weight of the above-mentioned polymerizable unsaterated compound (b-1).

The compounding of this pigment may be omitted in case a second intermediate coating (D) or (E) is coated on the coating film of the intermediate coating (B). Thus the coating film of the intermediate coating (B) may be either colorless and transparent, colored and transparent, or essentially non-transparent.

Moreover, in the intermediate coating (B), used in the present invention, there may be compounded, for the purpose of improving the coating film properties, for example, flexibility, bending property, chipping resistance, intercoat adhesion etc., polyester resin (b-5) and crosslinking agent (b-6) in addition to the above-mentioned components.

A polyester resin (b-5) is prepared usually by esterification reaction of polybasic acid and polyhydric alcohol and has preferably two or more hydroxyl groups on an average in the molecule.

A polybasic acid is a compound having two or more carboxylic groups in the molecule and includes, for example, phthalic acid, isophthalic acid, terephthalic acid, succinic acid, adipic acid, azelaic acid, cebacic acid, tetrahydrophthalic acid, hexahydrophthalic acid, 3,6-endo-dichloromethylene-tetrachlorophthalic acid, maleic acid, fumaric acid, itaconic acid, trimellithic acid and their anhydrides etc. A polyhydric alcohol is a compound having two or more hydroxyl groups in the molecule and includes, for example, ethylene glycol, propylene glycol, butylene glycol, hexanediol, diethylene glycol, dipropylene glycol, neopentyl glycol, triethylene glycol, glycerol, trimethylolethane, trimethylolpropane, pentaerythritol etc.

A polyester resin can be prepared by reacting these polybasic acid and polyhydric alcohol according to a per se known esterification process and, above all, a saturated polyester resin, having a hydroxyl group value in a range of 50–150 mgKOH/g, particularly 60–135 mgKOH/g, and more particularly 65–120 mgKOH/g, an acid value in a range of 0–30 mgKOH/g, particularly 0.5–20 mgKOH/g, and more particularly 1–10 mgKOH/g, and a number-average molecular weight in a range of about 3,000–20,000, particularly 4,000–17,000, and more particularly 5,000–13,000, is preferable.

Moreover, as a polyester resin (b-5) there can be used a fatty acid-modified polyester resin, modified by a (semi) drying oil fatty acid such as linseed oil fatty acid, coconut oil fatty acid, safflower oil fatty acid, soybean oil fatty acid, sesame oil fatty acid, perilla oil fatty acid, hempseed oil fatty acid, tall oil fatty acid, dehydrated castor oil fatty acid etc. The modification amount by these fatty acids is suitable in a range of generally less than 30% by weight, particularly 5–20% by weight, in terms of oil length. Furthermore, as a polyester resin (b-5) there can be used an unsaturated polyester resin having polymerizable unsaturated bonds in the molecule.

As a crosslinking agent (b-6) there can be used a compound which can conduct a crosslinking reaction with a functional group, such as hydroxyl group or carboxyl group etc., in the above-mentioned polyester resin (b-5). As examples, a melamine resin and a block polyisocyanate compound etc. can be mentioned.

A preferable melamine resin is a partially etherified or fully etherified melamine resin, in which methylol groups of the methylolized melamine are partly or fully etherified with a $C_{1-8}$ monohydric alcohol, having 1–5 triazine nuclei and a molecular weight in a range of 300–2,000. A melamine resin containing imino groups can be also used.

A block polyisocyanate compound is a polyisocyanate compound, all of whose isocyanate groups are essentially blocked by a blocking agent. When it is heated at the prescribed temperature, for example, 120–170° C., the blocking agent is dissociated and the isocyanate group is regenerated and conducts a crosslinking reaction with a polyester resin.

A polyisocyanate compound is a compound having two or more isocyanate groups in the molecule and includes, for example, aromatic diisocyanates such as tolylene diisocyanate, diphenylmethane diisocyanate, xylylene diisocyanate, naphthalene diisocyanate etc.; aliphatic diisocyanates such as tetramethylene diisocyanate, hexamethylene diisocyanate, dimer acid diisocyanate, lysine diisocyanate etc.; alicyclic diisocyanates such as methylenebis (cyclohexylisocyanate), isophorone diisocyanate, methylcyclohexane diisocyanate, cyclohexane diisocyanate, cyclopentane diisocyanate etc.; biuret type adducts, isocyanuric ring type adducts of said polyisocyanates; prepolymers having free isocyanate groups, obtained by reacting these polyisocyanates and low molecular weight or high molecular weight polyols under excess of isocyanate groups, etc. Preferable blocking agents are, for example, phenols, oximes, lactams, alcohols, mercaptans and active methylene type, acid amide type, imide type, amine type, imidazole type, urea type, carbamic acid type, imine type blocking agents etc. A block polyisocyanate has preferably a molecular weight in a range of generally 200–10,000, particularly 300–6000.

In case of using the above-mentioned polyester resin (b-5) and crosslinking agent (b-6), the compounding ratios of the above-mentioned components in the intermediate coating (B) are not strictly limited but may be varied according to the properties required for the targeted multilayer coating film. Generally, concerning the polymerizable unsaturated compound (b-1), the polyester resin (b-5) and the crosslinking agent (b-6), based upon the total amount of these 3 components, preferable ratios are in a range of 1–98% by weight, particularly 20–90% by weight, and more particularly 40–80% by weight, for the polymerizable unsaturated compound (b-1); 1–75% by weight, particularly 7–60% by weight, and more particularly 15–45% by weight, for the polyester resin (b-5); and 1–24% by weight, particularly 3–20% by weight, and more particularly 5–15% by weight, for the crosslinking agent (b-6). Suitable compounding amount of the photopolymerization initiator (b-2) is in a range of 0.1–10 parts by weight, particularly 0.3–7.5, and more particularly 0.5–5 parts by weight per 100 parts by weight of the total of the polymerizable unsaturated compound (b-1), the polyester resin (b-5) and the crosslinking agent (b-6). Suitable compounding amount of the thermal polymerization initiator (b-3) is in a range of 0.1–10 parts by weight, particularly 0.3–7.5, and more particularly 0.5–5 parts by weight per 100 parts by weight of the total of the polymerizable unsaturated compound (b-1), the polyester resin (b-5) and the crosslinking agent (b-6). In case a pigment (b-4) is compounded, its suitable amount is in a range of less than 250 parts by weight, particularly 1–200 parts by weight, and more particularly 3–150 parts by weight per 100 parts by weight of the total of the polymerizable unsaturated compound (b-1), the polyester resin (b-5) and the crosslinking agent (b-6).

The intermediate coating (B) can be prepared, for example, by mixing and dispersing the above-mentioned polymerizable unsaturated monomer (b-1), photopolymerization initiator (b-2), thermal polymerization initiator (b-3), and further optionally pigment (b-4) and/or polyester resin (b-5) and crosslinking agent (b-6) in, for example, hydrocarbon type, ester type, ether type, alcohol type or ketone type organic solvents. Optionally coating surface adjustment agents, antioxidants, flow adjustment agents, pigment dispersing agents etc. may be further compounded suitably. It is also possible to increase the curing property of the coating film by adding an alkanolamine such as triethanolamine, diethanolamine, monoethanolamine etc. in an amount of 0.1–20 parts by weight, preferably 0.5–10 parts by weight per 100 parts by weight of the total of the polymerizable unsaturated compound (b-1), the polyester resin (b-5) and the crosslinking agent (b-6).

The intermediate coating (B) is preferably coated, after adjusting, optionally using an organic solvent as mentioned above, the viscosity at the time of coating to 15–25 seconds/Ford cup #4/20° C. and the solid content to 40–95% by weight, preferably 50–85% by weight, on almost all surfaces of outer panels and inner panels of a cationic electrodeposition-coated automobile body (substrate) by electrostatic coating, airless spray, air spray etc. The coating film thickness is preferable in a range of 10–60 μm, particularly 15–40 μm in terms of cured coating film.

Thus coated intermediate coating film is cured by irradiation of an actinic ray, preferably after eliminating the organic solvent from the coating film by evaporation by drying at room or at the temperature lower than 100° C.

As an actinic energy ray there can be mentioned, for example, ultraviolet radiation, laser beam, X-ray, electron beam, ion beam etc. Among them it is preferable to use ultraviolet radiation and as its generating apparatus there can be mentioned, for example, mercury lamp, high tension mercury lamp, super high tension mercury lamp, xenon lamp, carbon arc, metal halide, gallium lamp, chemical lamp etc. The exposure of ultraviolet radiation is not strictly limited, but preferably in a range of usually about 10–3000 $mJ/cm^2$, particularly 100–2000 $mJ/cm^2$. Electron beam is preferably irradiated at 50–300 KeV, particularly 80–250 KeV, in an amount of 1–20 Mrad, particularly 3–15 Mrad. Suitable irradiation time of these radiations is usually 0.5 seconds to 5 minutes, particularly 0.5 seconds to 2 minutes.

On irradiating an actinic ray on the intermediate coating surface, it is difficult to uniformly irradiate the actinic ray through the whole intermediate coating surface according to the shape of the substrate. In case of an automobile body, for example, it is possible to irradiate the outer panels sufficiently, but the inner panels are irradiated insufficiently or sometimes not irradiated at all. The intermediate coating film, on which an actinic ray has been sufficiently irradiated, is cured by three-dimentional crosslinking in a short time and its gel ratio reaches about 90–100% by weight in case the intermediate coating film does not contain polyester resin or crosslinking agent, and about 30–95% by weight, preferably about 50–90% by weight in case it contains them. The smoothness is fairly good. On the other hand, the intermediate coating film at the part, where an actinic ray has been insufficiently irradiated or not irradiated at all, is scarcely cured by crosslinking and its gel ratio is less than about 50% by weight (in case the polyester resin and crosslinking agent are not included) or less than about 30% by weight (in case the polyester resin and crosslinking agent are included). Therefore a curing by crosslinking by heating is necessary. The smoothness is a little inferior to that of sufficiently irradiated parts. However, they are mainly inner panels whose finishing appearance is not so strongly required.

The "gel ratio" here is the ratio by weight calculated according to the formula: [(weight of the dry coating film after extraction/weight of the dry coating film before extraction)x100]. Each weight is measured after the following procedure: after a coating material comprising, out of the above-mentioned components constituting the intermediate coating (B), polymerizable unsaturated monomer, photopolymerization initiator, thermal polymerization initiator, organic solvent and further optionally polyester resin and crosslinking agent (no pigment is included), has been coated and dried at room temperature or at the temperature of less than 100° C. to eliminate the organic solvent from the coating film by evaporation, the coating film is cured by irradiation of an actinic ray. The isolated coating film is extracted by a mixed solvent of acetone and methanol at the same weight under reflux for 6 hours, and the remaining coating film is dried.

According to one aspect of the process of the present invention, a thermocurable top coating (C) is coated on the intermediate coating film surface, thus formed and irradiated with an actinic ray, and heated. By this procedure the top coating film is cured and at the same time the parts of the intermediate coating film, which were not cured yet or incompletely cured, are also cured to form a targeted multilayer coating film.

Especially in case that the intermediate coating (B) contains polyester resin (b-5) and crosslinking agent (b-6), the polyester resin is not cured essentially at the step of an actinic ray irradiation. At the same time with the curing by heating of the top coating film, however, the curing by crosslinking of the intermediate coating (B) proceeds to form a completely cured multilayer coating film.

Second Intermediate Coatings (D) and (E)

According to another aspect of the process of the present invention, an organic solvent type second intermediate coating (D) is coated on the coating film surface of the intermediate coating (B), formed as mentioned above and irradiated with an actinic ray, prior to the coating with the top coating (C). By this procedure a multilayer coating film of a high class finish can be formed.

The organic solvent type second intermediate coating (D) is a thermocurable coating material comprising polyester resin (d-1), crosslinking agent (d-2) and organic solvent and there is used a coating material which essentially does not contain the above-mentioned unsaturated monomer, photopolymerization initiator and thermal polymerization initiator.

As the polyester resin (d-1) and the crosslinking agent (d-2) to be compounded in the second intermediate coating (D), there can be used the compounds suitably selected from the polyester resins (b-5) and crosslinking agents (b-6) mentioned above as the components to be able to be compounded in the intermediate coating (B).

The compounding ratios of the polyester resin (d-1) and the crosslinking agent (d-2) in the second intermediate coating (D) are not strictly limited, but may be varied according to the properties required for the targeted multilayer coating film. Suitable compounding ratios, based upon the total amount of both said components, are generally 50–90% by weight, particularly 55–85% by weight, and more particularly 60–80% by weight for the former, and 50–10% by weight, particularly 45–15% by weight, and more particularly 40–20% by weight for the latter.

As an organic solvent there can be used, for example, hydrocarbon type, ester type, ether type, alcohol type, ketone type solvents, etc.

The second intermediate coating (D) can be prepared by mixing and dispersing the polyester resin (d-1) and the crosslinking agent (d-2) in an organic solvent. Further, as necessary, there can be suitably compounded pigments (d-3), coating surface adjustment agents, antioxidants, flow adjustment agents, pigment dispersing agents etc.

As a pigment (d-3) there can be used, for example, color pigments such as titanium oxide, zinc oxide, carbon black, Cadmium Red, Molybdenum Red, Chrome Yellow, chromium oxide, Prussian Blue, Cobalt Blue, azo pigments, phthalocyanine pigments, quinacridone pigments, isoindrine pigments, Threne type pigments, perylene pigments etc.; fillers such as talc, clay, kaolin, baryta, barium sulphate, barium carbonate, calcium carbonate, silica, alumina white etc.; metallic pigments such as alumunium powder, mica powder, mica powder coated with titanium oxide etc.

The compounding amount of such a pigment (d-3) in a second intermediate coating (D) is suitable in a range of generally less than 250 parts by weight, particularly 20–200 parts by weight, and more particularly 40–150 parts by weight per 100 parts by weight of the total of the polyester resin (d-1) and the crosslinking agent (d-2).

The second intermediate coating (D) is preferably coated, after adjusting, by compounding, as necessary, an organic solvent, the solid content to 20–70% by weight, preferably 40–60% by weight and the viscosity at the time of coating to 15–25 seconds/Ford cup #4/20° C., on the part, which has been irradiated with an actinic ray, and the part, which has not been irradiated, of the coating surface of the above-mentioned intermediate coating (B), by electrostatic coating, airless spray, air spray etc. The preferable coating film thickness is 10–50 μm, particularly 15–35 μm in terms of cured coating film.

The coating film thus coated with the second intermediate coating (D) is cured by heating at about 120 to about 160° C. for about 10 to about 40 minutes, after drying at room temperature to about 100° C. as necessary. By this heating the non-cured to incompletely cured parts of the first intermediate coating film, which has been formed by the intermediate coating (B), are estimated to be cured at the same time the second intermediate coating film is cured.

After the second intermediate coating film has been cured by heating, a thermocurable top coating (C) is coated on the intermediate coating film surface, then the top coating film is cured by heating to form the targeted multilayer coating film.

Furthermore, according to further aspect of the process of the present invention, an aqueous type second intermediate coating (E) is coated on the coating film surface of the intermediate coating (B), formed as mentioned above and irradiated with an actinic ray, prior to the coating with the top coating (C). By this procedure a multilayer coating film of a high class finish can be formed.

As an aqueous type second intermediate coating (E), there can be used a per se known thermocurable coating material using water as a solvent or a dispersing medium and there is no special limitation in its composition. However, the use of an amine neutralization type aqueous coating composition, comprising an amine neutralization product of a base resin, having a hydroxyl group value of 30–150 mgKOH/g and an acid value in a range of 15–50 mgKOH/g, (e-1), an amino resin (e-2) and an amine salt of organic sulphonic acid (e-3), is specifically preferable, because the intercoat adhesion, chipping resistance etc. of the formed multilayer coating film are improved.

This preferable amine neutralization type aqueous coating composition is further described hereinafter.

The base resin for the component (e-1) is a resin containing hydroxyl groups and carboxylic groups, such as polyester resin, acrylic resin, urethane resin, alkyd resin etc. Suitable resins have a hydroxyl group value of 30–150 mgKOH/g, preferably 40–135 mgKOH/g, and more preferably 60–120 mgKOH/g, and an acid value in a range of 15–50 mgKOH/g, preferably 17–45 mgKOH/g, and more preferably 20–40 mgKOH/g.

So long as having the above-mentioned characteristic values as the base resin for the component (e-1), any already known resin may be used and there is no special limitation in composition of monomer components constituting the resin or molecular weight of the resin. Its number-average molecular weight is suitable in a range of usually around 1,000–50,000, particularly 3,000–40,000, and more particularly 5,000–30,000.

An amine neutralization product of a base resin (e-1) can be obtained by neutralizing a part or all of the carboxyl groups in the above-mentioned base resin by an amine. As an amine to be used here there can be mentioned, for example, primary monoamines such as methylamine, ethylamine, n-propylamine, isopropylamine, butylamine, benzylamine, monoethanolamine, neopentanolamine, 2-aminopropanol, 3-aminopropanol, 2-amino-2-methylpropanol etc.; secondary monoamines such as dimethylamine, diethylamine, diisopropylamine, dibutylamine, diethanolamine, di-n-propanolamine, diisopropanolamine, N-methylethanolamine, N-ethylethanolamine, butylethanolamine etc.; tertiary monoamines such as triethanolamine, trimethylamine, triethylamine, triisopropylamine, tributylamine, methyldiethanolamine, ethyldiethanolamine, butyldiethanolamine, dimethylethanolamine etc.; polyamines such as diethylenetriamine, methylaminopropylamine etc., and the like. These amines are used alone or in combination of two or more. Among the above-mentioned amines, 2-amino-2-methylpropanol, N-methylethanolamine, dimethylethanolamine etc. are preferable. Using amount of amine may be selected suitably according to the amount of carboxylic groups in the base resin to be neutralized.

The neutralization reaction of the base resin and amine may be conducted according to a usual process at room temperature or by heating.

An amino resin (e-2) is used as a crosslinking agent for the amine neutralization product of a base resin (e-1). Specifically there can be mentioned as examples melamine resin, urea resin, benzoguanamine resin, methylolized products of these resins, or etherified amino resins, etherified a part or all the methylol groups of said methylolized products with $C_{1-8}$ monoalcohol. Among them a methylolmelamine resin, whose methylol groups are partly or all etherified with $C_{1-8}$ monoalcohol, is preferable. These amino resins have preferably a number-average molecular weight in a range of about 300–5,000, and particularly about 500–2,000.

An amine salt of organic sulphonic acid (e-3), is a compound obtained by reacting an organic sulphonic acid with an amine. As an organic sulphonic acid there can be mentioned, for example, paratoluenesulphonic acid, dodecylbenzenesulphonic acid, dinonylnaphthalenesulphonic acid, dinonylnaphthalenedisulphonic acid, trifluoromethanesulphonic acid etc. Among them dodecylbenzenesulphonic acid is particularly suitable. As an amine, the same amines as mentioned as neutralizing agent of the above-mentioned base resin can be preferably used. Among them, alkanolamines such as 2-amino-2-methylpropanol, N-methylethanolamine, dimethylethanolamine etc. are preferable. The reaction of an organic sulphonic acid with an amine is a neutralization reaction and it is preferable to react using excess amount of amine.

Constituting ratios of the above-mentioned amine neutralization product of a base resin (e-1) and the amino resin (e-2) in the aqueous type second intermediate coating (E) are not specifically limited. However, a preferable ratio based upon the total solid content of both said components is in a range of 50–90% by weight, particularly 55–85% by weight, and more particularly 60–80% by weight for the amine neutralization product of a base resin (e-1), and 50–10% by weight, particularly 45–15% by weight, and more particularly 40–20% by weight for the amino resin (e-2). Suitable amount of the amine salt of organic sulphonic acid (e-3) is in a range of 0.1–10 parts by weight, particularly 0.5–7.5 parts by weight, and more particularly 1–5 parts by weight per 100 parts by weight the total of the amine neutralization product of a base resin (e-1) and the amino resin (e-2).

The aqueous type second intermediate coating (E) can be prepared by suitably compounding these components, and further as necessary, a pigment, an ultraviolet absorbent etc.

Among them, as a pigment, there can be used, for example, color pigments such as titanium oxide, zinc oxide, carbon black, Cadmium Red, Molybdenum Red, Chrome Yellow, chromium oxide, Prussian Blue, Cobalt Blue, azo pigments, phthalocyanine pigments, quinacridone pigments, isoindrine pigments, Threne type pigments, perylene pigments etc.; fillers such as talc, clay, kaolin, baryta, barium sulphate, barium carbonate, calcium carbonate, silica, alumina white etc.; metallic pigments such as alumunium powder, mica powder, mica powder coated with titanium oxide etc. The preferable compounding amount of the pigment is in a range of 1–250 parts by weight, particularly 20–200 parts by weight, and more particularly 40–150 parts by weight per 100 parts by weight of the total solid content of the amine neutralization product of a base resin (e-1) and the amino resin (e-2).

The aqueous type second intermediate coating (E) is preferably coated, after adjusting, by compounding water with the above-mentioned components, the solid content to 20–70% by weight, preferably 40–60% by weight, and the viscosity at the time of coating to 15–25 seconds/Ford cup #4/20° C., on the coating surface of the part, irradiated with an actinic ray, and non-irradiated part of the coating film of the above-mentioned intermediate coating (B) by electrostatic coating, airless spray, air spray etc. The coating film thickness is preferably 10–50 $\mu$m, particularly 15–35 $\mu$m in terms of cured coating film.

The coating film thus coated with the second intermediate coating (E) is cured by heating at about 120 to about 160° C. for about 10 to about 40 minutes, after drying at room temperature or at about 100° C. as necessary. By this heating the non-cured or incompletely cured parts of the coating film of the intermediate coating (B) are estimated to be cured at the same time the second intermediate coating film is cured.

After the second intermediate coating film has been cured by heating, a thermocurable top coating (C) is coated on the intermediate coating film surface, then the top coating film is cured by heating to form the targeted multilayer coating film.

Thermocurable Top Coating (C)

As a thermocurable top coating (C), to be coated on the intermediate coating surface (which means the coating surface of the second intermediate coating (D) or (E) in case a second intermediate coating is coated, or otherwise, the coating surface of the intermediate coating (B)) according to the process of the present invention, there can be used a solid color coating (C-1), a metallic coating (C-2), a clear coating (C-3) etc. By using these in a suitable combination, a top coating film of solid color finish or metallic finish can be formed.

Solid color coating (C-1) is a thermocurable coating material comprising a base resin, a cross-linking agent, a color pigment and an organic solvent or water. As said base resin there can be mentioned, for example, resins having crosslinkable functional groups such as hydroxyl group, carboxyl group, silanol group, epoxy group etc., such as acrylic resins, polyester resins, alkyd resins, fluororesins, urethane resins, silicone-containing resins etc. and as a cross-linking agent, there can be mentioned compounds, which can react with these functional groups, such as melamine resins, urea resins, (block)polyisocyanate compounds, epoxy compounds or resins, carboxyl group-containing compounds or resins, acid anhydrides, alkoxysilane group-containing compounds or resins etc.

As a color pigment, there can be mentioned, for example, usual solid color pigments for coating material such as titanium oxide, zinc oxide, carbon black, Cadmium Red, Molybdenum Red, Chrome Yellow, chromium oxide, Prussian Blue, Cobalt Blue, azo pigments, phthalocyanine pigments, quinacridone pigments, isoindrine pigments, Threne type pigments, perylene pigments etc. and their compounding amount can be freely selected according to the color tone desired for the coating film. As an organic solvent, there can be used, for example, usual solvents for coating material such as hydrocarbon type, ester type, ether type, alcohol type, ketone type solvents, etc.

A solid color coating (C-1) can be prepared by mixing and dispersing these components. Their solid content concentration at the time of coating is suitably about 40 to about 70% by weight and the viscosity at the time of coating is suitably in a range of 15–25 seconds/Ford cup #4/20° C.

Metallic coating (C-2) is a thermocurable coating material comprising a base resin, a cross-linking agent, a metallic pigment and an organic solvent. Among them, as a base resin, a cross-linking agent and an organic solvent, there can be used the substances mentioned as examples for the solid color coating (C-1). As a metallic pigment there are included, for example, scale-like alumunium, mica, mica coated with metal oxide, mica-like iron oxide etc. The solid content concentration of about 15 to about 40% by weight and the viscosity in a range of 10–25 seconds/Ford cup #4/20° C. are preferable for the metallic coating (C-2) at the time of coating.

Clear coating (C-3) is a thermocurable coating material comprising a similar base resin, cross-linking agent and organic solvent to those mentioned concerning the solid color coating (C-1), and further compounding, as necessary, color pigment or metallic pigment to such an extent not to hinder the transparency. The solid content concentration of about 40 to about 70% by weight and the viscosity in a range of 15–25 seconds/Ford cup #4/20° C. are preferable for the clear coating (C-3) at the time of coating.

The process of the present invention can be worked by coating such a top coating (C) mainly on outer panels of a substrate such as automobile body, coated with an intermediate coating, and coating also on inner panels as necessary, and then curing by heating.

As specific processes to form a top coating film using a solid color coating (C-1), metallic coating (C-2) and/or clear coating (C-3) there are mentioned, for example, the following processes.

a) After coating a solid color coating (C-1), and further a clear coating (C-3) as necessary, on the intermediate coating film surface, the top coating film is curd by heating to form a multilayer coating film.

b) After coating a metallic coating (C-2) and a clear coating (C-3) on the intermediate coating film surface, the top coating film is curd by heating to form a multilayer coating film.

In the process a), a solid color coating (C-1) is coated on the intermediate coating film surface by means of electrostatic coating, airless spray or air spray etc. to obtain a cured film thickness of around 5–50 μm, preferably 10–40 μm, and either cured by heating at about 120 to about 160° C. for about 10 to about 40 minutes or not cured by heating. Then a clear coating (C-3) is further coated, as necessary, in a similar way to obtain a cured film thickness of around 10–80 μm, preferably 20–50 μm. Finally the coating film is cured by heating at about 120 to about 160° C. for about 10 to about 40 minutes to form a multilayer coating film.

In the process b), a metallic coating (C-2) is coated on the intermediate coating film surface by means of electrostatic coating, airless spray or air spray etc. to obtain a cured film thickness of around 10–50 μm, preferably 15–35 μm, and either cured by heating at about 120 to about 160° C. for about 10 to about 40 minutes or not cured by heating. Then a clear coating (C-3) is further coated in a similar way to obtain a cured film thickness of around 10–80 μm, preferably 20–50 μm. Finally the coating film is cured by heating at about 120 to about 160° C. for about 10 to about 40 minutes to form a multilayer coating film.

As mentioned above the special feature of the process of the present invention is to use an intermediate coating (B), which can be cured both by irradiation of an actinic ray and by heating, on the electrodeposition coating surface, which has been cured by heating, to cure the intermediate coating film by irradiation of an actinic ray, to optionally coat and cure by heating an organic solvent type or aqueous type second intermediate coating (D) or (E), and then to coat and cure by heating a top coating (C). As a result, almost all of the unevenness of the cationic electrodeposition coating surface is eliminated by curing the intermediate coating film, and when a top coating is further coated on that coating surface, all of the unevenness of the cationic electrodeposition coating surface is eliminated. Therefore, the smoothness is improved and no generation of popping caused by baking is observed, even if the intermediate coating film is thick. Moreover, as the intermediate coating film is not heated but cured by irradiation of an actinic ray, curing needs only a very short time and shortening of operation steps becomes possible.

The present invention is hereinafter described more specifically by way of Examples and Comparative Examples. Parts and % are all by weight.

1. PREPARATION OF SAMPLES

1) Substrate:

A thermocurable epoxy resin type cationic electrodeposition coating ("Elecron 9600" Made by Kansai Paint Co., Ltd., Trade name) is electrodeposition coated on a 0.8 mm thick dull finished steel plate, which has been chemically treated with zinc phosphate, to achieve a cured film thickness of about 20 μm, and cured by heating at 170° C. for 30 minutes to obtain a substrate.

2) Intermediate Coating (B)

(a): 60 parts of a polyester oligomer obtained by addition of acrylic acid to a polyester resin containing hydroxyl groups (having a number-average molecular weight of 1500 and two polymerizable double bonds in the molecule), 40 parts of pentaerythritol triacrylate, 3 parts of 2-benzyl-2-dimethylamino-1-(4-morpholinophenyl)-1-butanone-1 (photopolymerization initiator), 5 parts of t-butylperoxy-2-ethylhexanoate (thermal polymerization initiator) and 60 parts of Titanium White pigment are mixed and dispersed in a mixed solvent of xylene and Swasol1500 (Made by Cosmo Oil Co., Ltd., Trade name, hydrocarbon type solvent) to the same weight to obtain an intermediate coating (B-a), whose viscosity and solid content has been adjusted to 20 seconds/Ford cup #4/20° C. and 85%, respectively.

(b): 40 parts of a polyester oligomer obtained by addition of acrylic acid to a polyester resin containing hydroxyl groups (having a number-average molecular weight of 1500 and two polymerizable double bonds in the molecule), 60 parts of pentaerythritol triacrylate, 3 parts of 2-benzyl-2-dimethylamino-1-(4-morpholinophenyl)-1-butanone-1 (photopolymerization initiator), 5 parts of t-butylperoxy-2-ethylhexanoate (thermal polymerization initiator) and 60 parts of Titanium White pigment are mixed and dispersed in a mixed solvent of xylene and Swasol1500 (Made by Cosmo Oil Co., Ltd., Trade name, hydrocarbon type solvent) to the same weight to obtain an intermediate coating (B-b), whose viscosity and solid content has been adjusted to 20 seconds/Ford cup #4/20° C. and 85%, respectively.

(c): 15 parts of a saturated polyester resin, modified by soybean oil fatty acid (hydroxyl group value: 100 mgKOH/g, acid value: 5 mgKOH/g, number-average molecular weight: about 6000, oil length: 15% by weight), 14 parts of a saturated polyester resin (hydroxyl group value: 120 mgKOH/g, acid value: 10 mgKOH/g, number-average molecular weight: about 7000, oil length: 0% by weight), 8 parts of a saturated polyester resin (hydroxyl group value: 78 mgKOH/g, acid value: 29 mgKOH/g, number-average molecular weight: about 7000, oil length: 0% by weight), 13 parts of butylated melamine resin, 30 parts of a polyester oligomer obtained by addition of acrylic acid to a polyester resin containing hydroxyl groups (having a number-average molecular weight of 1500 and two polymerizable double bonds in the molecule), 20 parts of pentaerythritol triacrylate, 1.5 parts of 2-benzyl-2-dimethylamino-1-(4-morpholinophenyl)-1-butanone-1 (photopolymerization initiator), 2.5 parts of t-butyl-peroxy-2-ethylhexanoate (thermal polymerization initiator) and 60 parts of Titanium White pigment are mixed and dispersed in a mixed solvent of xylene and Swasol 1500 (Made by Cosmo Oil Co., Ltd., Trade name, hydrocarbon type solvent) to the same weight to obtain an intermediate coating (B-c), whose viscosity and solid content has been adjusted to 20 seconds/Ford cup #4/20° C. and 85%, respectively.

(d): 10 parts of a saturated polyester resin, modified by soybean oil fatty acid (hydroxyl group value: 100 mgKOH/g, acid value: 5 mgKOH/g, number-average molecular weight: about 6000, oil length: 15% by weight), 7 parts of a saturated polyester resin (hydroxyl group value: 120 mgKOH/g, acid value: 10 mgKOH/g, number-average molecular weight: about 7000, oil length: 0% by weight), 5 parts of a saturated polyester resin (hydroxyl group value: 78 mgKOH/g, acid value: 29 mgKOH/g, number-average molecular weight: about 7000, oil length: 0% by weight), 8 parts of butylated melamine resin, 40 parts of a polyester oligomer obtained by addition of acrylic acid to a polyester resin containing hydroxyl groups (having a number-average molecular weight of 1500 and two polymerizable double bonds in the molecule), 30 parts of pentaerythritol triacrylate, 2 parts of 2-benzyl-2-dimethylamino-1-(4-morpholinophenyl)-1-butanone-1 (photopolymerization initiator), 3.5 parts of t-butylperoxy-2-ethylhexanoate (thermal polymerization initiator) and 60 parts of Titanium White pigment are mixed and dispersed in a mixed solvent of xylene and Swasol 1500 (Made by Cosmo Oil Co., Ltd., Trade name, hydrocarbon type solvent) to the same weight to obtain an intermediate coating (B-d), whose viscosity and solid content has been adjusted to 20 seconds/Ford cup #4/20° C. and 85%, respectively.

3) Organic Solvent Type Second Intermediate Coating (D)

(a): 15 parts of a saturated polyester resin, modified by soybean oil fatty acid (hydroxyl group value: 100 mgKOH/g, acid value: 5 mgKOH/g, number-average molecular weight: about 6000, oil length: 15% by weight), 14 parts of a saturated polyester resin (hydroxyl group value: 120 mgKOH/g, acid value: 10 mgKOH/g, number-average molecular weight: about 7000, oil length: 0% by weight), 8 parts of a saturated polyester resin (hydroxyl group value: 78 mgKOH/g, acid value: 29 mgKOH/g, number-average molecular weight: about 7000, oil length: 0% by weight), 13 parts of butylated melamine resin and 60 parts of Titanium White pigment are mixed and dispersed in a mixed solvent of xylene and Swasol1500 (Made by Cosmo Oil Co., Ltd., Trade name, hydrocarbon type solvent) to the same weight to obtain an intermediate coating (D-a), whose viscosity and solid content has been adjusted to 20 seconds/Ford cup #4/20° C. and 60%, respectively.

(b): 10 parts of a saturated polyester resin, modified by soybean oil fatty acid (hydroxyl group value: 100 mgKOH/g, acid value: 5 mgKOH/g, number-average molecular weight: about 6000, oil length: 15% by weight), 7 parts of a saturated polyester resin (hydroxyl group value: 120 mgKOH/g, acid value: 10 mgKOH/g, number-average molecular weight: about 7000, oil length: 0% by weight), 5 parts of a saturated polyester resin (hydroxyl group value: 78 mgKOH/g, acid value: 29 mgKOH/g, number-average molecular weight: about 7000, oil length: 0% by weight), 8 parts of butylated melamine resin and 60 parts of Titanium White pigment are mixed and dispersed in a mixed solvent of xylene and Swasol1500 (Made by Cosmo Oil Co., Ltd., Trade name, hydrocarbon type solvent) to the same weight to obtain an intermediate coating (D-b), whose viscosity and solid content has been adjusted to 20 seconds/Ford cup #4/20° C. and 60%, respectively.

4) Aqueous Type Second Intermediate Coating (E)

Prescribed amount (indicated by solid content weight) of each component shown in Table 1 is mixed and dispersed by adding a suitable amount of water so that the viscosity becomes to 30 seconds/Ford cup #4/20° C., solid content 60%, and obtained an aqueous type second e coating (E).

TABLE 1

| Aqueous type second intermediate coating (E) | a | b | c |
|---|---|---|---|
| Component (e-1) | | | |
| Amine neutralized PE resin ① | 65 | | |
| Amine neutralized PE resin ② | | 75 | |
| Amine neutralized PE resin ③ | | | 80 |
| Component (e-2) | | | |
| Melamine resin | 35 | 25 | 20 |
| Component (e-3) | | | |
| Dimethylethanol amine salt of dodecylbenzenesulphonic acid | 2 | 2 | 2 |
| Pigment component | | | |
| Titanium White | 70 | 70 | 70 |

Details of each component used in Table 1 are as follows.

Amine neutralized PE resin ①: A resin obtained by neutralizing a polyester resin having a hydroxyl group value of 85 mgKOH/g and an acid value of 40 mgKOH/g (number-average molecular weight: 10000; a substance obtained by reacting neopentyl glycol, trimethylolpropane, adipic acid and phthalic anhydride and then adding trimellithic anhydride) with dimethylethanolamine.

Amine neutralized PE resin ②: A resin obtained by neutralizing a polyester resin having a hydroxyl group value of 85 mgKOH/g and an acid value of 25 mgKOH/g (number-average molecular weight: 10000; a substance obtained by reacting neopentyl glycol, trimethylolpropane, adipic acid and phthalic anhydride and then adding trimellithic anhydride) with dimethylethanolamine.

Amine neutralized PE resin ③: A resin obtained by neutralizing a polyester resin having a hydroxyl group value of 100 mgKOH/g and an acid value of 25 mgKOH/g (number-average molecular weight: 12000; a substance obtained by reacting neopentyl glycol, trimethylolpropane, adipic acid and phthalic anhydride and then adding trimellithic anhydride) with dimethylethanolamine.

Melamine resin: "Cymel350", Trade name, made by Mitsui Cytec Co., Ltd., number-average molecular weight: 450.

2. EXAMPLES AND COMPARATIVE EXAMPLES

Example 1

Intermediate coating (B-a) (solid content 85%) was coated on the whole surface of the above-mentioned substrate, coated with a cationic electrodeposition coating, by air spray to obtain 35 μm cured coating film, dried at room temperature for 5 minutes, then an ultraviolet radiation of 1000 mJ/cm$^2$ was irradiated to about half of the intermediate coating film by a metal halide lamp for about 2 seconds. Then onto both coating surfaces of ultraviolet-irradiated and non-irradiated parts, "Amilac Black" (Made by Kansai Paint Co., Ltd., trade name, polyester resin/melamine resin type top coating: black) was coated as a top coating to 15 μm (cured coating film) film thickness and heated at 140° C. for 30 minutes to cure these coating films. Coating film performance test results are shown in the following Table 2.

Example 2

Intermediate coating (B-c) (solid content 85%) was coated on the whole surface of the above-mentioned substrate, coated with a cationic electrodeposition coating, by air spray to obtain 35 μm cured coating film, dried at room temperature for 5 minutes, then an ultraviolet radiation of 1000 mJ/cm$^2$ was irradiated to about half of the intermediate coating film by a metal halide lamp for about 2 seconds. Then onto both coating surfaces of ultraviolet-irradiated and non-irradiated parts, "Amilac Black" (Made by Kansai Paint Co., Ltd., trade name, polyester resin/melamine resin type top coating, black) was coated as a top coating to 15 μm (cured coating film) film thickness and heated at 140° C. for 30 minutes to cure these coating films. Coating film performance test results are shown in the following Table 2.

Example 3

Intermediate coating (B-d) (solid content 85%) was coated on the whole surface of the above-mentioned substrate, coated with a cationic electrodeposition coating, by air spray to obtain 35 μm cured coating film, dried at room temperature for 5 minutes, then an ultraviolet radiation of 1000 mJ/cm$^2$ was irradiated to about half of the intermediate coating film by a metal halide lamp for about 2 seconds. Then onto both coating surfaces of ultraviolet-irradiated and non-irradiated parts, there were coated "Magicron Silver Metallic" (Made by Kansai Paint Co., Ltd., trade name, acrylic resin/melamine resin type metallic coating) to 15 μm (cured coating film) and "Magicron Clear" (Made by Kansai Paint Co., Ltd, trade name, acrylic resin/melamine resin type clear coating) to 35 μm (cured coating film) wet-on-wet and heated at 140° C. for 30 minutes to cure these coating films at the same time. Coating film performance test results are shown in the following Table 2.

Comparative Example 1

Intermediate coating (D-a) (solid content 60%) was coated on the whole surface of the above-mentioned substrate, coated with a cationic electrodeposition coating, by air spray to obtain 35 μm cured coating film, dried at room temperature for 5 minutes and heated at 140° C. for 30 minutes to cure this coating film, then "Amilac Black" was coated to 15 μm (cured coating film) and heated at 140° C. for 30 minutes to cure these coating films at the same time. Coating film performance test results are shown in the following Table 2.

Comparative Example 2

Intermediate coating (D-b) (solid content 60%) was coated on the whole surface of the above-mentioned substrate, coated with a cationic electrodeposition coating, by air spray to obtain 35 μm cured coating film, dried at room temperature for 5 minutes, then there were coated "Magicron Silver Metallic" (Made by Kansai Paint Co., Ltd., trade name, acrylic resin/melamine resin type metallic coating) to 15 μm (cured coating film) and "Magicron Clear" (Made by Kansai Paint Co., Ltd., trade name, acrylic resin/melamine resin type clear coating) to 35 pm (cured coating film) wet-on-wet and heated at 140° C. for 30 minutes to cure these coating films at the same time. Coating film performance test results are shown in the following Table 2.

TABLE 2

| | Example | | | | | | Comparative Example | |
|---|---|---|---|---|---|---|---|---|
| | 1 | | 2 | | 3 | | 1 | 2 |
| Observed part | I | N | I | N | I | N | N | N |
| Smoothness | ○ | Δ | ○ | Δ | ○ | Δ | ○ | X |
| Popping | ○ | Δ | ○ | Δ | ○ | Δ | ○ | X |
| Operation steps shortening | ○ | — | ○ | — | ○ | — | X | ○ |

Note:
I: irradiated,
N: non-irradiated

In Table 2,

Observed part: "I" is the part where an ultraviolet radiation was irradiated on the intermediate coating surface and "N" is the part where an ultraviolet radiation was not irradiated on the intermediate coating surface Smoothness: result of a visual evaluation, on the top coat surface, of a generation of unevenness caused by the electrodeposition coating film, indicated as ○: no unevenness is observed at all, Δ: unevenness is observed a little, X unevenness is observed clearly and in large quantity.

Popping: result of a visual evaluation of a generation of popping on the top coat surface, indicated as ○: no generation of popping is observed at all, Δ: generation of popping is observed a little, X generation of popping is observed clearly and in large quantity.

Operation steps shortening: ○ indicates that the operation steps were shortened, and X indicates that the operation steps were not shortened.

Example 4

Intermediate coating (B-a) (solid content 85%) was coated on the whole surface of the above-mentioned substrate, coated with a cationic electrodeposition coating, by air spray to obtain 25 μm cured coating film, dried at room temperature for 5 minutes, then an ultraviolet radiation of 1000 mJ/cm$^2$ was irradiated to about half of the intermediate coating film by a metal halide lamp for about 2 seconds. Then onto both coating surfaces of ultraviolet-irradiated and non-irradiated parts, an organic solvent type second intermediate coating (D-a) was coated by air spray to obtain 20 $\mu$m cured coating film, dried at room temperature for 5 minutes, and then heated at 140° C. for 30 minutes to cure these coating films. After that, on both coating surfaces, "Amilac Black" (Made by Kansai Paint Co., Ltd., trade name, polyester resin/melamine resin type black top coating) [top coating (C)] was coated to 15 $\mu$m (cured coating film) film thickness and heated at 140° C. for 30 minutes to cure the coating film. Coating film performance test results are shown in the following Table 3.

Example 5

Intermediate coating (B-b) was coated on the whole surface of the above-mentioned substrate, coated with a cationic electrodeposition coating, by air spray to obtain 25 $\mu$m cured coating film, dried at room temperature for 5 minutes, then an ultraviolet radiation of 1000 mJ/cm$^2$ was irradiated to about half of the intermediate coating film by a metal halide lamp for about 2 seconds. Then onto both coating surfaces of ultraviolet-irradiated and non-irradiated parts, an organic solvent type second intermediate coating (D-b) (solid content 60%) was coated by air spray to obtain 20 $\mu$m cured coating film, dried at room temperature for 5 minutes, and then heated at 140° C. for 30 minutes to cure these coating films. After that, on both coating surfaces, there were coated "Magicron Silver Metallic" (Made by Kansai Paint Co., Ltd., trade name, acrylic resin/melamine resin type metallic coating) [top coating (C)] to 15 $\mu$m (cured coating film) and "Magicron Clear" (Made by Kansai Paint Co., Ltd., trade name, acrylic resin/melamine resin type clear coating) [top coating (C)] to 35 $\mu$m (cured coating film) wet-on-wet and heated at 140° C. for 30 minutes to cure these coating films at the same time. Coating film performance test results are shown in the following Table 3.

Example 6

Intermediate coating (B-c) (solid content 85%) was coated on the whole surface of the above-mentioned substrate, coated with a cationic electrodeposition coating, by air spray to obtain 25 $\mu$m cured coating film, dried at room temperature for 5 minutes, then an ultraviolet radiation of 1000 mJ/cm$^2$ was irradiated to about half of the intermediate coating film by a metal halide lamp for about 2 seconds. Then onto both coating surfaces of ultraviolet-irradiated and non-irradiated parts, an organic solvent type second intermediate coating (D-a) (solid content 60%) was coated by air spray to obtain 20 $\mu$m cured coating film, dried at room temperature for 5 minutes, and then heated at 140° C. for 30 minutes to cure these coating films. After that, on both coating surfaces, "Amilac Black" (Made by Kansai Paint Co., Ltd., trade name, polyester resin/melamine resin type black top coating) [top coating (C)] was coated to 15 $\mu$m (cured coating film) film thickness and heated at 140° C. for 30 minutes to cure the coating film. Coating film performance test results are shown in the following Table 3.

Example 7

Intermediate coating (B-d) (solid content 85%) was coated on the whole surface of the above-mentioned substrate, coated with a cationic electrodeposition coating, by air spray to obtain 25 $\mu$m cured coating film, dried at room temperature for 5 minutes, then an ultraviolet radiation of 1000 mJ/cm$^2$ was irradiated to about half of the intermediate coating film by a metal halide lamp for about 2 seconds. Then onto both coating surfaces of ultraviolet-irradiated and non-irradiated parts, an organic solvent type second intermediate coating (D-b) (solid content 60%) was coated by air spray to obtain 20 $\mu$m cured coating film, dried at room temperature for 5 minutes, and then heated at 140° C. for 30 minutes to cure these coating films. After that, on both coating surfaces, there were coated "Magicron Silver Metallic" (Made by Kansai Paint Co., Ltd., trade name, acrylic resin/melamine resin type metallic coating) [top coating (C)] to 15 $\mu$m (cured coating film) and "Magicron Clear" (Made by Kansai Paint Co., Ltd., trade name, acrylic resin/melamine resin type clear coating) [top coating (C)] to 35 $\mu$m (cured coating film) wet-on-wet and heated at 140° C. for 30 minutes to cure these coating films at the same time. Coating film performance test results are shown in the following Table 3.

Comparative Example 3

Intermediate coating (B-a) (solid content 85%) was coated on the above-mentioned substrate, coated with a cationic electrodeposition coating, by air spray to obtain 25 $\mu$m cured coating film, dried at room temperature for 5 minutes, then an organic solvent type second intermediate coating (D-a) (solid content 60%) was coated by air spray to obtain 20 $\mu$m cured coating film, dried at room temperature for 5 minutes, and then heated at 140° C. for 30 minutes to cure both these coating films. After that, on the coating surface, "Amilac Black" (Made by Kansai Paint Co., Ltd., trade name, polyester resin/melamine resin type black top coating,) [top coating (C)] was coated to 15 $\mu$m (cured coating film) film thickness and heated at 140° C. for 30 minutes to cure the coating film. Coating film performance test results are shown in the following Table 3.

Comparative Example 4

Intermediate coating (B-a) (solid content 85%) was coated on the above-mentioned substrate, coated with a cationic electrodeposition coating, by air spray to obtain 25 $\mu$m cured coating film, dried at room temperature for 5 minutes, and heated at 140° C. for 30 minutes to cure this coating film. Then on that coating surface, an organic solvent type second intermediate coating (D-a) (solid content 60%) was coated by air spray to obtain 20 $\mu$m cured coating film, dried at room temperature for 5 minutes, and then heated at 140° C. for 30 minutes to cure the coating film. After that, on that coating surface, "Amilac Black" (Made by Kansai Paint Co., Ltd., trade name, polyester resin/melamine resin type black top coating,) [top coating (C)] was coated to 15 $\mu$m (cured coating film) film thickness and heated at 140° C. for 30 minutes to cure the coating film. Coating film performance test results are shown in the following Table 3.

TABLE 3

| | Example | | | | Comparative Example | |
|---|---|---|---|---|---|---|
| | 4 | 5 | 6 | 7 | 3 | 4 |
| Intermediate coating (B) | a | b | c | d | a | a |
| Curing | U | U | U | U | — | B |
| Organic solvent type intermediate coating (D) | a | b | a | b | a | a |
| Curing | B | B | B | B | B | B |

TABLE 3-continued

| | Example | | | | | | | | Comparative Example | |
|---|---|---|---|---|---|---|---|---|---|---|
| | 4 | | 5 | | 6 | | 7 | | 3 | 4 |
| Top coating (C) | S | | M | | S | | M | | S | S |
| Curing | B | | B | | B | | B | | B | B |
| Observed part | I | N | I | N | I | N | I | N | — | — |
| Smoothness | ○ | Δ | ○ | Δ | ○ | Δ | ○ | Δ | Δ | ○ |
| Popping | ○ | Δ | ○ | Δ | ○ | Δ | ○ | Δ | Δ | ○ |
| Operation steps shortening | ○ | | ○ | | ○ | | ○ | | ○ | X |

Note:
I: (irradiated),
N: (non-irradiated)

In Table 3,

Curing: "U" indicates ultraviolet curing and "B", thermal curing (baking).

Top coating (C): "S" indicates solid color finish and "M", metallic finish.

Observed part, Smoothness, Popping and Operation steps shortening: Same as in Table 2.

Example 8

Intermediate coating (B-a) (solid content 85%) was coated on the whole surface of the above-mentioned substrate, coated with a cationic electrodeposition coating, by air spray to obtain 25 μm cured coating film, dried at room temperature for 5 minutes, then an ultraviolet radiation of 1000 mJ/cm$^2$ was irradiated to about half of said intermediate coating surface by a metal halide lamp for about 2 seconds. Then onto both coating surfaces of ultraviolet-irradiated and non-irradiated parts, an aqueous type second intermediate coating (E-a) was coated by air spray to obtain 20 μm cured coating film, dried at room temperature for 5 minutes, and then heated at 140° C. for 30 minutes to cure these coating films. After that, on both coating surfaces, "Amilac Black" (Made by Kansai Paint Co., Ltd., trade name, polyester resin/melamine resin type black top coating) [top coating (C)] was coated to 35 μm (cured coating film) film thickness and heated at 140° C. for 30 minutes to cure the coating film. Coating film performance test results are shown in the following Table 4.

Example 9

Intermediate coating (B-b) was coated on the whole surface of the above-mentioned substrate, coated with a cationic electrodeposition coating, by air spray to obtain 25 μm cured coating film, dried at room temperature for 5 minutes, then an ultraviolet radiation of 1000 mJ/cm$^2$ was irradiated to about half of said intermediate coating surface by a metal halide lamp for about 2 seconds. Then onto both coating surfaces of ultraviolet-irradiated and non-irradiated parts, an aqueous type second intermediate coating (E-b) was coated by air spray to obtain 20 μm cured coating film, dried at room temperature for 5 minutes, and then heated at 140° C. for 30 minutes to cure these coating films. After that, on both coating surfaces, there were coated "Magicron Silver Metallic" (Made by Kansai Paint Co., Ltd., trade name, acrylic resin/melamine resin type metallic coating) [top coating (C)] to 15 μm (cured coating film) and "Magicron Clear" (Made by Kansai Paint Co., Ltd., trade name, acrylic resin/melamine resin type clear coating) [top coating (C)] to 35 μm (cured coating film) wet-on-wet and heated at 140° C. for 30 minutes to cure both coating films at the same time. Coating film performance test results are shown in the following Table 4.

Example 10

Intermediate coating (B-b) was coated on the whole surface of the above-mentioned substrate, coated with a cationic electrodeposition coating, by air spray to obtain 25 μm cured coating film, dried at room temperature for 5 minutes, then an ultraviolet radiation of 1000 mJ/cm$^2$ was irradiated to about half of said intermediate coating surface by a metal halide lamp for about 2 seconds. Then onto both coating surfaces of ultraviolet-irradiated and non-irradiated parts, an aqueous type second intermediate coating (E-c) was coated by air spray to obtain 20 μm cured coating film, dried at room temperature for 5 minutes, and then heated at 140° C. for 30 minutes to cure these coating films. After that, on both coating surfaces, there were coated "Magicron Silver Metallic" (Made by Kansai Paint Co., Ltd., trade name, acrylic resin/melamine resin type metallic coating) [top coating (C)] to 15 μm (cured coating film) and "Magicron Clear" (Made by Kansai Paint Co., Ltd., trade name, acrylic resin/melamine resin type clear coating) [top coating (C)] to 35 μm (cured coating film) wet-on-wet and heated at 140° C. for 30 minutes to cure both coating films at the same time. Coating film performance test results are shown in the following Table 4.

Example 11

Intermediate coating (B-c) (solid content 85%) was coated on the whole surface of the above-mentioned substrate, coated with a cationic electrodeposition coating, by air spray to obtain 25 μm cured coating film, dried at room temperature for 5 minutes, then an ultraviolet radiation of 1000 mJ/cm$^2$ was irradiated to about half of said intermediate coating surface by a metal halide lamp for about 2 seconds. Then onto both coating surfaces of ultraviolet-irradiated and non-irradiated parts, an aqueous type second intermediate coating (E-a) was coated by air spray to obtain 20 μm cured coating film, dried at room temperature for 5 minutes, and then heated at 140° C. for 30 minutes to cure these coating films. After that, on both coating surfaces, "Amilac Black" (Made by Kansai Paint Co., Ltd., trade name, polyester resin/melamine resin type black top coating) [top coating (C)] was coated to 35 μm (cured coating film) film thickness and heated at 140° C. for 30 minutes to cure the coating film. Coating film performance test results are shown in the following Table 4.

Example 12

Intermediate coating (B-d) (solid content 85%) was coated on the whole surface of the above-mentioned substrate, coated with a cationic electrodeposition coating, by air spray to obtain 25 μm cured coating film, dried at room temperature for 5 minutes, then an ultraviolet radiation of 1000 mJ/cm$^2$ was irradiated to about half of said intermediate coating surface by a metal halide lamp for about 2 seconds. Then onto both coating surfaces of ultraviolet-irradiated and non-irradiated parts, an aqueous type second intermediate coating (E-b) was coated by air spray to obtain 20 μm cured coating film, dried at room temperature for 5 minutes, and then heated at 140° C. for 30 minutes to cure these coating films. After that, on both coating surfaces, there were coated "Magicron Silver Metallic" (Made by Kansai Paint Co., Ltd., trade name, acrylic resin/melamine resin type metallic coating) [top coating (C)] to 15 μm (cured coating film) and "Magicron Clear" (Made by Kansai Paint Co., Ltd., trade name, acrylic resin/melamine resin type clear coating) [top coating (C)] to 35 μm (cured coating film) wet-on-wet and heated at 140° C. for 30 minutes to cure both coating films at the same time. Coating film performance test results are shown in the following Table 4.

Example 13

Intermediate coating (B-d) (solid content 85%) was coated on the whole surface of the above-mentioned substrate, coated with a cationic electrodeposition coating, by air spray to obtain 25 μm cured coating film, dried at room temperature for 5 minutes, then an ultraviolet radiation of 1000 $mJ/cm^2$ was irradiated to about half of said intermediate coating surface by a metal halide lamp for about 2 seconds. Then onto both coating surfaces of ultraviolet-irradiated and non-irradiated parts, an aqueous type second intermediate coating (E-c) was coated by air spray to obtain 20 μm cured coating film, dried at room temperature for 5 minutes, and then heated at 140° C. for 30 minutes to cure these coating films. After that, on both coating surfaces, there were coated "Magicron Silver Metallic" (Made by Kansai Paint Co., Ltd., trade name, acrylic resin/melamine resin type metallic coating) [top coating (C)] to 15 μm (cured coating film) and "Magicron Clear" (Made by Kansai Paint Co., Ltd., trade name, acrylic resin/melamine resin type clear coating) [top coating (C)] to 35 μm (cured coating film) wet-on-wet and heated at 140° C. for 30 minutes to cure both coating films at the same time. Coating film performance test results are shown in the following Table 4.

Comparative Example 5

Intermediate coating (B-a) (solid content 85%) was coated on the above-mentioned substrate, coated with a cationic electrodeposition coating, by air spray to obtain 25 μm cured coating film, dried at room temperature for 5 minutes, then an aqueous type second intermediate coating (E-a) was coated by air spray to obtain 20 μm cured coating film, dried at room temperature for 5 minutes, and then heated at 140° C. for 30 minutes to cure both these coating films. After that, on this coating surface, "Amilac Black" (Made by Kansai Paint Co., Ltd., trade name, polyester resin/melamine resin type black top coating) was coated to 35 μm (cured coating film) film thickness and heated at 140° C. for 30 minutes to cure the coating film. Coating film performance test results are shown in the following Table 4.

Comparative Example 6

Intermediate coating (B-a) (solid content 85%) was coated on the above-mentioned substrate, coated with a cationic electrodeposition coating, by air spray to obtain 25 μm cured coating film, dried at room temperature for 5 minutes, and heated at 140° C. for 30 minutes to cure this coating film. Then on that coating surface, an aqueous type second intermediate coating (E-a) was coated by air spray to obtain 20 μm cured coating film, dried at room temperature for 5 minutes, and then heated at 140° C. for 30 minutes to cure the coating film. After that, on this coating surface, "Amilac Black" (Made by Kansai Paint Co., Ltd., trade name, polyester resin/melamine resin type black top coating) was coated to 35 μm (cured coating film) film thickness and heated at 140° C. for 30 minutes to cure the coating film. Coating film performance test results are shown in the following Table 4.

TABLE 4

| | Example | | | | | | | | | | | | Comparative Example | |
|---|---|---|---|---|---|---|---|---|---|---|---|---|---|---|
| | 8 | | 9 | | 10 | | 11 | | 12 | | 13 | | 5 | 6 |
| Intermediate coating (B) | a | | b | | b | | c | | d | | d | | a | a |
| Curing method | U | | U | | U | | U | | U | | U | | — | B |
| Aqueous type intermediate coating (E) | a | | b | | c | | a | | b | | c | | a | a |
| Curing method | B | | B | | B | | B | | B | | B | | B | B |
| Top coating (C) | S | | M | | M | | S | | M | | M | | S | S |
| Curing method | B | | B | | B | | B | | B | | B | | B | B |
| Performance test results | | | | | | | | | | | | | | |
| Observed part | I | N | I | N | I | N | I | N | I | N | I | N | — | — |
| Smoothness | ○ | Δ | ○ | Δ | ○ | Δ | ○ | Δ | ○ | Δ | ○ | Δ | Δ | ○ |
| Popping | ○ | Δ | ○ | Δ | ○ | Δ | ○ | Δ | ○ | Δ | ○ | Δ | Δ | ○ |
| Intercoat adhesion | ○ | ○ | ○ | ○ | ○ | ○ | ○ | ○ | ○ | ○ | ○ | ○ | ○ | ○ |
| Chipping resistance | ○ | ○ | ○ | ○ | ○ | ○ | ○ | ○ | ○ | ○ | ○ | ○ | ○ | |
| Operation steps shortening | ○ | | ○ | | ○ | | ○ | | ○ | | ○ | | ○ | X |

Note:
I: (irradiated),
N: (non-irradiated)

In Table 4,

Curing: "U" indicates ultraviolet curing and "B", thermal curing (baking).

Top coating (C): "S" indicates solid color finish and "M", metallic finish.

Observed part, Smoothness, Popping and Operation steps shortening: Same as in Table 2.

Chipping resistance: Using Gravelometer (Made by Q Panel, trade name) as a testing machine, a shock is given to a coating film by blowing 500 g of No.7 crushed stones by an air pressure of 0.3 MPa at 20° C. onto the coating surface of the coated plate obtained by Examples and Comparative Examples at an angle of 450 Then an adhesive tape is stuck on said coating surface, and the state of peeling-off of coating film around the crack caused by the shock is examined, after rapidly peeling-off the adhesive tape. ○ indicates that no or little peeling-off of coating film around the crack is observed, Δ indicates that a little peeling-off of coating film around the crack is observed, and X indicates that much peeling-offs of coating film around the crack are observed.

What is claimed is:

1. A multilayer coating film formation process characterized by that after a cationic electrodeposition coating is coated on a substrate and cured by heating, an intermediate coating, comprising polymerizable unsaturated compound, photopolymerization initiator and thermal polymerization initiator, is coated, and the coating film is partially cured by irradiation with an actinic energy ray, and then a thermocurable top coating is coated and cured by heating.

2. The process set forth in claim 1, wherein a cationic electrodeposition coating comprises a base resin having hydroxyl groups and cationizable groups, and a crosslinking agent.

3. The process set forth in claim 1, wherein a cationic electrodeposition coating comprises a resin, obtained by reacting a polyglycidyl ether of a polyphenol compound with a cationizing agent, and a block polyisocyanate compound.

4. The process set forth in claim 1, wherein a polymerizable unsaturated compound has 2–5 polymerizable unsaturated bonds in the molecule.

5. The process set forth in claim 1, wherein a polymerizable unsaturated compound has a number-average molecular weight in a range of 50–3,000.

6. The process set forth in claim 1, wherein the intermediate coating contains a photopolymerization initiator in a range of 0.1–10 parts by weight per 100 parts by weight of the polymerizable unsaturated compound.

7. The process set forth in claim 1, wherein the intermediate coating contains a thermal polymerization initiator in a range of 0.1–10 parts by weight per 100 parts by weight of the polymerizable unsaturated compound.

8. The process set forth in claim 1, wherein the intermediate coating further contains a pigment of less than 250 parts by weight per 100 parts by weight of the polymerizable unsaturated compound.

9. The process set forth in claim 1, wherein the intermediate coating further contains a polyester resin and a crosslinking agent.

10. The process set forth in claim 9, wherein a polyester resin is a saturated poloyester resin having two or more hydroxyl groups on an average in the molecule.

11. The process set forth in claim 9, wherein a polyester resin is a polyester resin, modified with a fatty acid having an oil length of less than 30% by weight.

12. The process set forth in claim 9, wherein a crosslinking agent is a melamine resin or a block polyisocyanate compound.

13. The process set forth in claim 9, wherein the intermediate coating contains in a range of 1–98% by weight of a polymerizable unsaturated compound, 1–75% by weight of a polyester resin and 1–24% by weight of a crosslinking agent based upon a total amount of polymerizable unsaturated compound, polyester resin and crosslinking agent.

14. The process set forth in claim 9, wherein the intermediate coating contains in a range of 0.1–10 parts by weight of a photopolymerization initiator and 0.1–10 parts by weight of a thermal polymerization initiator per 100 parts by weight of the total of the polymerizable unsaturated compound, polyester resin and crosslinking agent.

15. The process set forth in claim 1, wherein the actinic ray is ultraviolet radiation, laser beam, X-ray, electron beam or ion beam.

16. The process set forth in claim 15, wherein the ultraviolet radiation is irradiated in an amount of 10–3000 $mJ/cm^2$.

17. The process set forth in claim 15, wherein the electron beam at 50–300 KeV is irradiated in an amount of 1–20 Mrad.

18. The process set forth in claim 1, wherein after the intermediate coating is coated and irradiated with an actinic ray, an organic solvent type second intermediate coating, comprising a polyester resin and a crosslinking agent, is coated and cured by heating, and then a thermocurable top coating is coated.

19. The process set forth in claim 18, wherein a polyester resin is a saturated polyester resin having two or more hydroxyl groups on an average in the molecule.

20. The process set forth in claim 18, wherein a polyester resin is a polyester resin, modified with a fatty acid having an oil length of less than 30% by weight.

21. The process set forth in claim 18, wherein a crosslinking agent is a melamine resin or a block polyisocyanate compound.

22. The process set forth in claim 18, wherein the second intermediate coating contains in a range of 50–90% by weight of a polyester resin and 50–10% by weight of a crosslinking agent based upon a total amount of polyester resin and crosslinking agent.

23. The process set forth in claim 18, wherein the coating film of the second intermediate coating is cured by heating at about 120 to about 160° C.

24. The process set forth in claim 1, wherein after the intermediate coating is coated and irradiated with an actinic energy ray, an aqueous type second intermediate coating is coated and cured by heating, and then a thermocurable top coating is coated.

25. The process set forth in claim 24, wherein the second intermediate coating is an amine neutralization type aqueous coating composition comprising an amine neutralization product of a base resin, having a hydroxyl group value of 30–150 mgKOH/g and an acid value in a range of 15–50 mgKOH/g, an amino resin and an amine salt of an organic sulphonic acid.

26. The process set forth in claim 25, wherein the base resin has a number-average molecular weight of 1,000–50,000.

27. The process set forth in claim 25, wherein the amino resin is a methylolmelamine resin, whose methylol groups are etherified at least partly with a $C_{1-8}$ monoalcohol.

28. The process set forth in claim 25, wherein the amine salt of an organic sulphonic acid is an alkanolamine salt of dodecylbenzenesulphonic acid.

29. The process set forth in claim 25, wherein the second intermediate coating contains in a range of 50–90% by weight of an amine neutralization product of a base resin and 50–10% by weight of an animo resin based upon a total solid content amount of an amine neutralization product of a base resin and an amino resin.

30. The process set forth in claim 25, wherein the second intermediate coating contains in a range of 0.1–10 parts by weight of an amine salt of an organic sulphonic acid per 100 parts by weight of a total of the amine neutralization product of a base resin and the animo resin.

31. The process set forth in claim 25, wherein the coating film of the second intermediate coating is cured by heating at about 120 to about 160° C.

32. The process set forth in claim 1, wherein the thermocurable top coating is a solid color coating, a metallic coating or a clear coating.

33. The process set forth in claim 32, wherein after a solid color coating, and, as necessary, further a clear coating, has been coated on the intermediate coating film surface, the top coating film is cured by heating.

34. The process set forth in claim 32, wherein after a metallic coating and a clear coating have been coated on the intermediate coating film surface, the top coating film is cured by heating.

35. The process set forth in claim 1, wherein the substrate is outer panels of an automobile body.

36. An article coated by the process set forth in claim 1.

* * * * *